United States Patent
Hahn et al.

(10) Patent No.: US 8,386,431 B2
(45) Date of Patent: Feb. 26, 2013

(54) METHOD AND SYSTEM FOR DETERMINING DATABASE OBJECT ASSOCIATED WITH TENANT-INDEPENDENT OR TENANT-SPECIFIC DATA, CONFIGURED TO STORE DATA PARTITION, CURRENT VERSION OF THE RESPECTIVE CONVERTOR

(75) Inventors: Uwe H. O. Hahn, Berlin (DE); Torsten Strahl, Kleinmachnow (DE); Henrik Hempelmann, Havelberg (DE)

(73) Assignee: SAP AG, Walldorf (DE)

( * ) Notice: Subject to any disclaimer, the term of this patent is extended or adjusted under 35 U.S.C. 154(b) by 128 days.

(21) Appl. No.: 12/815,036

(22) Filed: Jun. 14, 2010

(65) Prior Publication Data

US 2011/0307450 A1  Dec. 15, 2011

(51) Int. Cl.
*G06F 17/00* (2006.01)
*G06F 17/30* (2006.01)
*G06F 13/00* (2006.01)

(52) U.S. Cl. ........ 707/649; 707/635; 707/640; 707/694; 707/803; 711/173

(58) Field of Classification Search .................. 707/651, 707/659, 638, 695, 756, 790–795, 806–810, 707/821–925, 635, 640, 646, 649, 694, 803–805; 709/203–206; 711/129, 154, 162–163, 172–173; 712/1, 13

See application file for complete search history.

(56) References Cited

U.S. PATENT DOCUMENTS

| | | | |
|---|---|---|---|
| 5,787,466 A * | 7/1998 | Berliner ........................ | 711/117 |
| 5,809,179 A * | 9/1998 | Marimont et al. ............ | 382/254 |
| 5,907,849 A * | 5/1999 | Dias et al. ..................... | 1/1 |
| 6,101,495 A * | 8/2000 | Tsuchida et al. ............. | 1/1 |
| 6,289,339 B1 * | 9/2001 | Weber .......................... | 707/770 |
| 6,615,317 B2 * | 9/2003 | Roseborough et al. ....... | 711/129 |

(Continued)

FOREIGN PATENT DOCUMENTS

WO    WO 2010/005430    * 1/2010

OTHER PUBLICATIONS

Jonathan E. Cook et al. "A Highly Effective Partition Selection Policy for Object Database Garbage Collection", IEEE Transactions on Knowledge and Data Engineering, Vol. 10, No. 1, Jan./Feb. 1998, pp. 153-172.*

(Continued)

*Primary Examiner* — Srirama Channavajjala
(74) *Attorney, Agent, or Firm* — Buckley, Maschoff & Talwalkar LLC

(57) ABSTRACT

A system includes a database instance having a data storage system with a data store area storing first and second data partitions, where the respective data partitions each include a plurality of database pages storing respective tenant-independent/-specific data and respective first/second converters associated with the respective partitions. A database management system (DBMS) to receive a request for a database object and determine whether the database object is associated with tenant-independent data or with tenant-specific data. If the database object is associated with tenant-independent data, the DBMS determines a location of first database pages associated with the database object within the first plurality of database pages based on the first converter. Or if associated with tenant-specific data, the DBMS determines a location of second database pages associated with the database object within the second plurality of database pages based on the second converter. A method is also disclosed.

18 Claims, 14 Drawing Sheets

U.S. PATENT DOCUMENTS

| | | | | |
|---|---|---|---|---|
| 6,792,429 | B2* | 9/2004 | Gilbert | 1/1 |
| 7,249,152 | B2* | 7/2007 | Muthulingam et al. | 1/1 |
| 7,353,240 | B1* | 4/2008 | Takamoto et al. | 1/1 |
| 7,440,979 | B2* | 10/2008 | Strahl et al. | 1/1 |
| 7,519,636 | B2* | 4/2009 | Strahl et al. | 1/1 |
| 7,664,799 | B2* | 2/2010 | Mukherjee et al. | 707/695 |
| 7,774,329 | B1* | 8/2010 | Peddy et al. | 707/705 |
| 7,890,456 | B2* | 2/2011 | Hempelmann et al. | 707/610 |
| 8,150,904 | B2* | 4/2012 | Queck et al. | 709/201 |
| 8,209,644 | B2* | 6/2012 | Gee et al. | 716/100 |
| 8,245,230 | B2* | 8/2012 | Danko | 718/102 |
| 2003/0093647 | A1* | 5/2003 | Mogi et al. | 712/1 |
| 2005/0223174 | A1* | 10/2005 | Mogi et al. | 711/129 |
| 2006/0230079 | A1* | 10/2006 | Strahl et al. | 707/203 |
| 2007/0156902 | A1 | 7/2007 | Becker | |
| 2008/0177975 | A1* | 7/2008 | Kawamura | 711/173 |
| 2008/0217393 | A1* | 9/2008 | Hempelmann et al. | 235/375 |
| 2009/0089307 | A1* | 4/2009 | Strahl et al. | 707/101 |

OTHER PUBLICATIONS

Rekha Goel et al. "Transparent Parallel Replication of Logically Partitioned databases", 1996 IEEE, pp. 132-137.*

Peer Hasselmeyer et al., "Towards Holistic Multi-Tenant Monitoring for Virtual Data Centers", Network Operations and Management Symposium Workshops (NOMS WKSPS), 2010 IEEE/IFIP, IEEE, Apr. 19, 2010, XP031690670, ISBN: 978-1-4244-6037-3, (pp. 350-356, 7 pages total).

Stefan Aulbach, et al., "Multi-Tenant Databases for Software as a Service: Schema-Mapping Techniques", Proceedings of the ACM Sigmod International Conference on Management of Data Sigmod 2008, Jun. 9, 2008, XP002602702, DOI: 10.1145/1376616.1376736, (pp. 1195-1206, 12 pages total).

"European Search Report of the European Patent Office", dated Aug. 18, 2011, for EP 11004154.8-1527, 6pgs.

\* cited by examiner

```
                    Configuration File
300   TenantSpacePath    : /SAP_DB/Tenantspace
      DataVolumeName0001 : Data1    DataVolumeSize0001 : 6,500,000
      DataVolumeName0002 : Data2    DataVolumeSize0001 : 6,500,000
      DataVolumeName0003 : Data3    DataVolumeSize0003 : 6,500,000
```

*FIG. 3*

```
                    IOMAN_InfoPage
400   VolumeId    : 1          pageType    : IOManInfo
      capacity    : 11333      blockSize   : 8192
      badBlockNo  : 0          badResetCnt : 0
      rstVolumeId : 2          rstBlockNo  : 34
```

*FIG. 4*

```
                    Restart_Record
                    [Volume 2, Block 34]
500   SavepointID           : 104120    Snapshot_Info : 2/3445
      Tenant Directory Root : 47512
      Converter Root        : 3/200
```

*FIG. 5*

```
Snapshot_Info    [Volume 2, Block 3445]

rstVolumeId/rstBlockNo of snap1:  3/8857 rstVolumeId/rstBlockNo of snap2:  1/853 rstVolumeId/rstBlockNo of snap3:  1/307
```

*FIG. 6*

| Tenant Value | Partition Id | Volume Name | Tenant Space Id | State |
|---|---|---|---|---|
| 014 | 42 | TEN14 | PWDF2020:DB79:2009-12-24 | READY |
| 072 | 512 | TEN72 | PWDF2020:DB79:2009-10-07 | READY |
| 049 | 1000 | TEN49 | PWDF2020:DB79:2009-11-24 | MOVE |
| 999 | 1 | TEN999 | PWDF2020:DB79:2009-11-25 | IMPORT |

*FIG. 7*

```
                Tenant 001 IOMAN_InfoPage

Tenant Space ID    : PWDF2020:db79:2009-12-24
Tenant Space Size  : 1300000
rstVolumeId        : 1         rstBlockNo      : 6522
```

| Object Name | File ID | Columns | Object Type | Permissions | Indices |
|---|---|---|---|---|---|
| ~~~~ | 000200000000002A | ~~~~ | Tenant | ~~~~ | ~~~~ |
| ~~~~ | 000500000000002A | ~~~~ | Tenant | ~~~~ | ~~~~ |
| ~~~~ | 00000000000023C | ~~~~ | Common | ~~~~ | ~~~~ |
| ~~~~ | 00000000000D43FA | ~~~~ | Common | ~~~~ | ~~~~ |

| File ID | File System ID | Partition ID | Master Partition File ID | Root | Leaf Size | Index Size |
|---|---|---|---|---|---|---|
| 000000000000002A | 0 | 0 | null | null | 72 | 16 |
| 000200000000002A | 0 | 2 | 000000000000002A | 74404 | 32 | 8 |
| 000500000000002A | 0 | 5 | 000000000000002A | 14666 | 40 | 8 |
| 00000000000023C | 0 | 0 | 00000000000023C | 23455 | 56 | 16 |

*FIG. 14*

METHOD AND SYSTEM FOR DETERMINING DATABASE OBJECT ASSOCIATED WITH TENANT-INDEPENDENT OR TENANT-SPECIFIC DATA, CONFIGURED TO STORE DATA PARTITION, CURRENT VERSION OF THE RESPECTIVE CONVERTOR

FIELD

Some embodiments relate to database systems. In particular, some embodiments concern systems for providing database functions to more than one tenant company.

BACKGROUND

More specifically, some embodiments relate to the support of client-specific extension fields for business objects within a multi-tenant business process platform.

BACKGROUND

Some software systems, such as SAP Business By Design®, provide database services to multiple clients (tenants) from a single application platform. Multi-tenant support may reduce a total cost of ownership so that such services may be offered at competitive prices. Although the application platform is shared among tenants, each tenant is associated with a separate database which includes all data that may be accessed by the tenant.

Each separate database requires individual maintenance and administrative efforts. These efforts include backup and recovery, lifecycle management (e.g., upgrades, change requests, testing) and tenant-specific adaptations (e.g., to address performance and/or disk space). The costs of these efforts typically overwhelm any savings achieved by using a single application platform.

To reduce database-related costs, a single database may be used to store the data of all supported tenants. For example, a "Sales" table may include a "Tenant" column to allow retrieval of tenant-specific information therefrom. Such a scenario raises obvious data security concerns. Moreover, it would be difficult to move or copy data associated with a single tenant to a different system.

To address the foregoing, systems are desired to support multiple tenants within a single database instance. Such systems preferably facilitate copying and/or moving of tenant-specific data among database instances.

BRIEF DESCRIPTION OF THE DRAWINGS

FIG. 3 illustrates a portion of a configuration file of a database instance according to some embodiments.

FIG. 4 illustrates a portion of an I/O management page of a database instance according to some embodiments.

FIG. 5 illustrates a portion of a restart record of a database instance according to some embodiments.

FIG. 6 illustrates a portion of a snapshot information page of a database instance according to some embodiments.

FIG. 7 illustrates a portion of a tenant directory according to some embodiments.

FIG. 8 illustrates a portion of a tenant I/O management page of a database instance according to some embodiments.

FIG. 13 illustrates a portion of a database catalog according to some embodiments.

FIG. 14 illustrates a portion of a file directory according to some embodiments.

DETAILED DESCRIPTION

Figure 1:
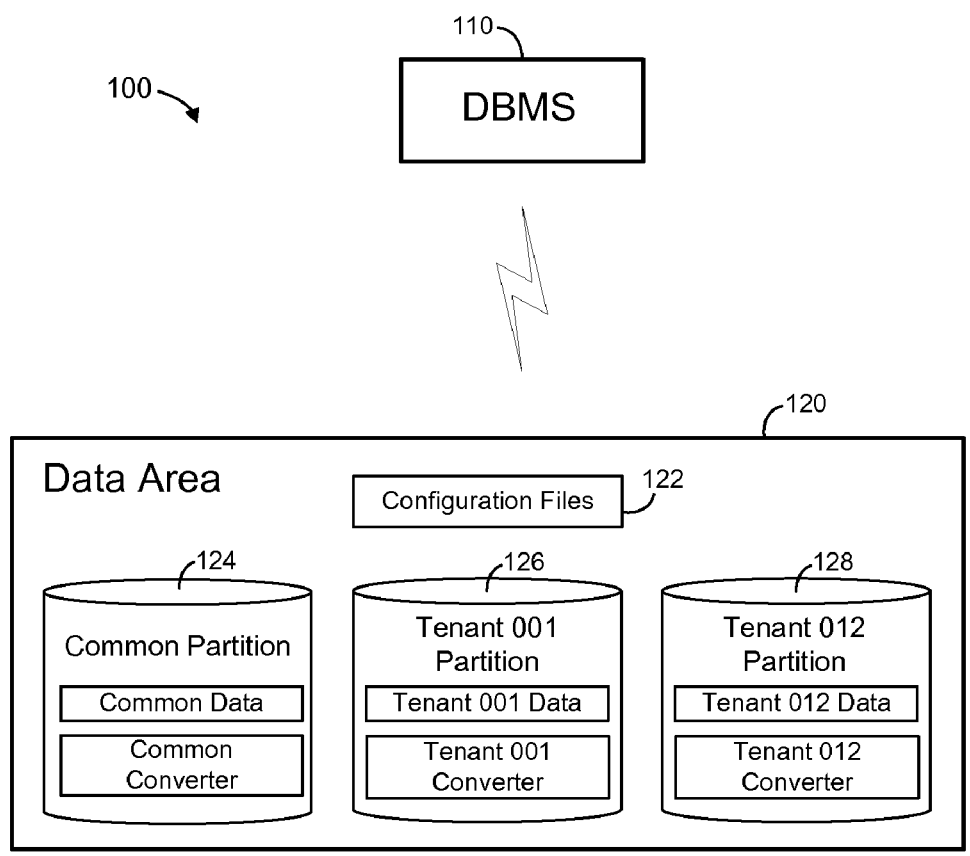
FIG. 1 is a block diagram of an executing database instance according to some embodiments.

FIG. 1 is a block diagram of database 100 according to some embodiments. The present description will use the terms "database" and "database instance" interchangeably.

Database 100 may include other unshown elements that may be used during operation thereof, such as any suitable program code, scripts, or other functional data that is executable to interface with other elements, other applications, other data files, operating system files, and device drivers. These elements are known to those in the art, and are therefore not described in detail herein.

Database 100 may communicate with one or more database applications (not shown) over one or more interfaces provided by database management system (DBMS) 110. DBMS 110 may comprise any system for managing a database instance that is or becomes known. Generally, DBMS 120 may receive requests for data (e.g., Structured Query Language (SQL) requests from a database application), may retrieve the requested data from data area 120 or from I/O buffer cache 130, and may return the requested data to the requestor. DBMS 110 may also perform start-up, logging, recovery, management, optimization, monitoring, indexing, integrity checks and other database-related tasks. In some embodiments, DBMS 110 includes an SQL manager to process received SQL statements and a data access manager to manage access to stored data.

The requestor may provide business monitoring, inventory control, online shopping, and/or any other suitable functions. The requestor may, in turn, support client applications that may be executed by client devices. Such a client application may simply comprise a Web browser to access and display reports generated by a database application.

Data area 120 may comprise one or more disparate physical systems for storing data. These physical systems may comprise a portion of a physical hard disk, an entire physical hard disk, or a storage system composed of several physical hard disks. Data area 120 may include application data consisting of database objects and associated index entries. The database objects may include tables, indexes, views, users and user groups.

According to the illustrated embodiment, data area 120 includes common partition 124, tenant 001 partition 126, and tenant 012 partition 128. Each partition is illustrated and described as corresponding to a single data volume but embodiments are not limited thereto. For example, each partition may comprise any number of volumes, including fractional volumes.

Common partition 124 stores common data. Common data is tenant-independent data that is not particularly associated with any tenant. Data area 124 also includes tenant 001 partition 126 and tenant 012 partition 128. Tenant 001 partition 126 includes tenant 001 data and tenant 012 partition 128 includes tenant 012 data. Tenant 001 data is associated with a first tenant (i.e., tenant 001) and tenant 012 data is associated with a second tenant (i.e., tenant 012).

The tenant values "001" and "012" are logical mandant numbers. A tenant value belongs to a user-defined database type TENANT. This system-wide type is defined in order to create a tenant-aware table. For example, DBMS 110 may implement an SQL statement: "CREATE TENANT TYPE CLIENT CHAR(3) UNICODE". After successful execution of the statement, the database type CLIENT is available for use in a CREATE TABLE statement. Every table with a key column of CLIENT type thereby becomes tenant-aware.

Such a table uses at least two key columns, because the column of type CLIENT is not part of the physical representation of the table in data area 120, and because the corresponding b*tree requires a sort criterion (i.e., another key column). The tenant value is not part of the physical representation because, in case of a TENANT COPY or MOVE operation as described below, the tenant value of the copied tenant might be changed if its original value is in use in the destination database instance. Therefore, rather than execute a time-consuming global change of all tenant records, the tenant value is only "virtually" added to the tenant-aware tables by DBMS 110.

Each partition may also be identified by a unique partition Id to identify a tenant space within database instance 100. This partition Id might not be unique across database instances, so a tenant space Id may be also used as a global unique Id for a tenant space. Accordingly, the tenant space Id associated with a tenant space of a first database instance is retained when the first database instance is moved or copied to another database instance.

The internal abstraction of a tenant value is realized by the partition ID.

Each of partitions 124, 126 and 128 is subdivided into storage areas known as blocks. The data of each partition is stored in logical pages each having the same size as a block. Accordingly, a particular page of data may be accessed by referencing a corresponding data volume and a block address of the data volume.

When a new page is created, the page is assigned a unique logical page number. Each of partitions 124, 126 and 128 includes a dedicated converter associated with the logical pages of the partition. For example, the tenant 001 converter maps each logical page number of tenant 001 data to a volume and block address of tenant 001 partition 126 at which the page is stored.

Data area 120 also includes configuration files 122 defining properties of database instance 100 (e.g., a size and physical location of each data volume, a maximum number of data volumes in data area 120, a tenant space path, etc.).

Data area 120 may include more or fewer data volumes, partitions and tenants than illustrated in FIG. 1. The data of data area 120 may be received from disparate hardware and software systems, some of which are not interoperational with one another. The systems may comprise a back-end data environment employed in a business or industrial context. The data may be pushed to database instance 100 and/or provided in response to queries received therefrom.

Some embodiments of the FIG. 1 arrangement may provide efficient access to and management of tenant-specific data for several tenants within a single database. Administration tasks such as backup, recovery, integrity checks, etc. may be performed instance-wide and therefore simultaneously for each of multiple tenants. Since the prior tenant-specific databases described in the Background often include significant amounts of identical data, the use of a common partition including this data may offer disk space savings. Moreover, some embodiments of the foregoing features provide efficient movement or copying of tenant-specific data from one database to another.

For example, a tenant supported by a first database may upgrade its Service Level Agreement to receive increased system performance which cannot be provided by the first database. Some embodiments facilitate movement of the tenant's data to another database which is capable of providing the increased performance. Examples of such movement are described below.

Figure 2:
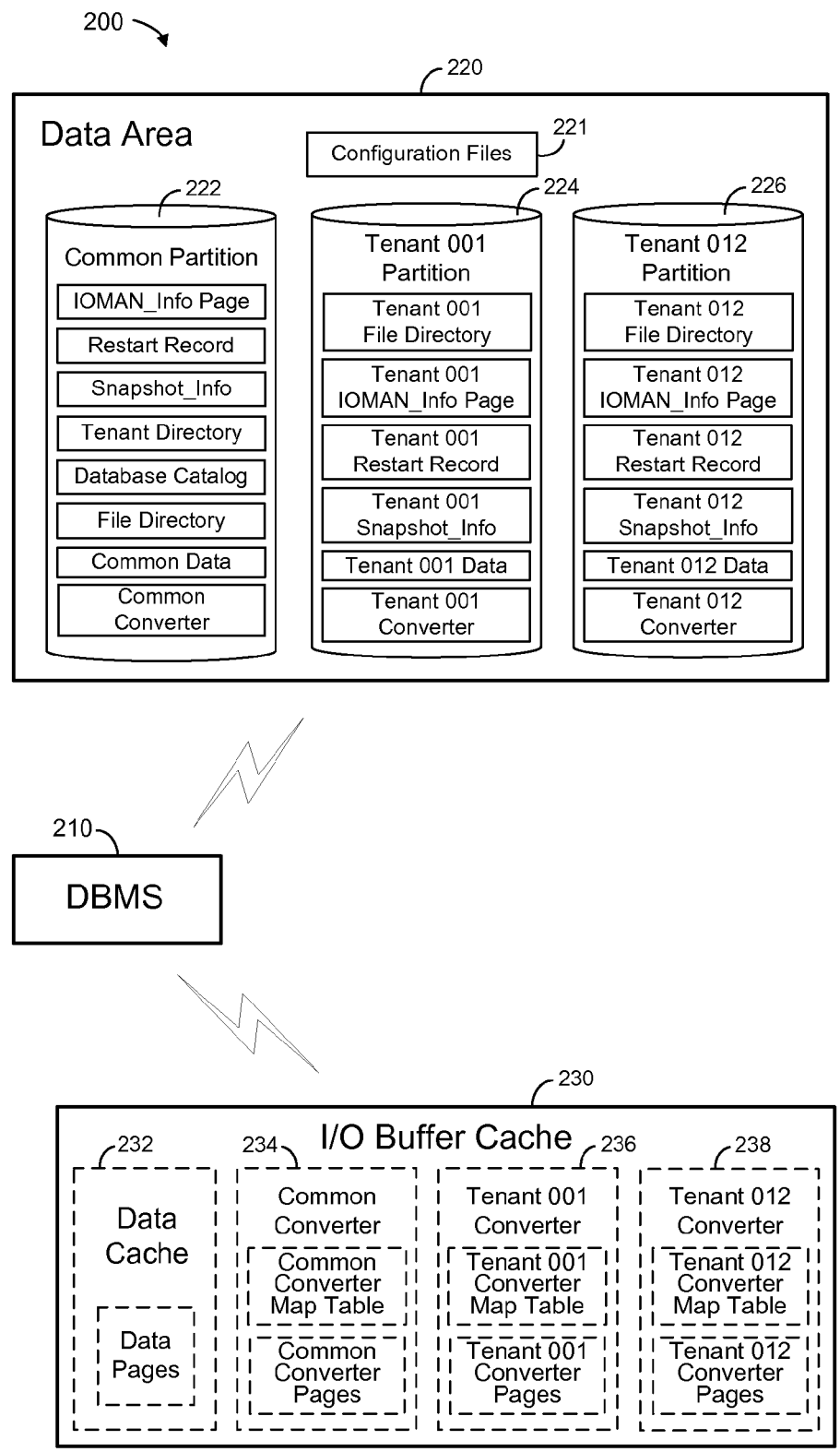
FIG. 2 is a block diagram of an executing database instance according to some embodiments.

FIG. 2 is a block diagram of executing database instance 200 according to some embodiments. An executing database instance, generally, includes at least one operating system process, a physical data storage system and a data cache (e.g., Random Access Memory). These components are represented in FIG. 2, respectively, by DBMS 210, data area 220, and I/O buffer cache 230, but embodiments may include any other suitable instantiations of these components. DBMS 210 and data area 220 may exhibit any of the features described above with respect to DBMS 110 and data area 120.

Data area 220 includes configuration files 221 as described above. Configuration file 300 of FIG. 3 provides an example of configuration files 221 according to some embodiments. Configuration file 300 is associated with a data area in which a common partition includes three data volumes. Configuration file 300 specifies a name and a size of each data volume in the common partition and a tenant space path. Configuration file 300 may include additional information as is known in the art.

Common partition 222 includes several data structures to facilitate operation according to some embodiments. These structures include, but are not limited to, an IOMAN_Info page, a restart record, and a snapshot_info page.

The IOMAN_Info page may be located at block 0 of the data volume of common partition 222 and may include fields to identify a location of a current restart record. For example, IOMan_InfoPage 400 of FIG. 4 includes rstVolumeId and rstBlockNo fields indicating that a root page of the current restart record is located at volume 2, block 34 of the common partition. Again, in contrast to data area 200, the common partition including IOMan_InfoPage 400 includes more than one (i.e., at least two) data volumes.

Restart record 500 of FIG. 5 includes member Snapshot_Info to reference a location of a snapshot_info page, which, as illustrated in the example of FIG. 6, lists restart records of all snapshots of instance 200. Restart record 500 also indicates a location of a root page of a tenant directory stored in common partition 222, and a location of a root page of the common converter also stored in common partition 222.

FIG. 7 illustrates a portion of tenant directory 700 according to some embodiments. Tenant directory 700 indicates, for each tenant of data area 220, a tenant value, a partition Id, a volume name, a tenant space Id and a state. Tenant directory 700 and the tenant space path of configuration file 300 may be used to locate tenant partitions during operation according to some embodiments.

Common partition 222 also includes a file directory associating file identifiers of the common data with logical page numbers. In turn, the common converter of common partition 222 associates the logical page numbers with physical locations of common partition 222. These physical locations represent a "last known good" version of the logical pages, as will be described below.

Each of partitions 224 and 226 includes a dedicated file directory, IOMAN_Info page, restart record, snapshot_info page and converter as described above. As illustrated in FIG. 8, tenant 001 IOMAN_Info page 800 provides a location of tenant 001 restart record 900 of FIG. 9, which in turn provides a location of tenant 001 snapshot_info page 1000 of FIG. 10.

Tenant 001 restart record 900 also indicates a location of a root page of the tenant 001 file directory and a location of a root page of the tenant 001 converter. Accordingly, partition 224 includes information to identify a file within tenant 001 data based on its file Id. For example, the tenant 001 file directory may be used to determine a logical page number based on the file identifier, and the tenant 001 converter may be used to locate a root page of the file within partition 224 based on the logical page number.

Therefore, in addition to facilitating independent storage and location of tenant 001 data, tenant 001 partition 224 also includes information to recover tenant 001 data to a "last known good" state, and to restore a snapshot of a prior "last known good" state.

Tenant 001 restart record 900 also indicates a location of a root page of a tenant-specific catalog. As will be described below, metadata of the catalog may be moved along with tenant-specific data during a COPY or MOVE of the partition to another database instance.

Figure 9:
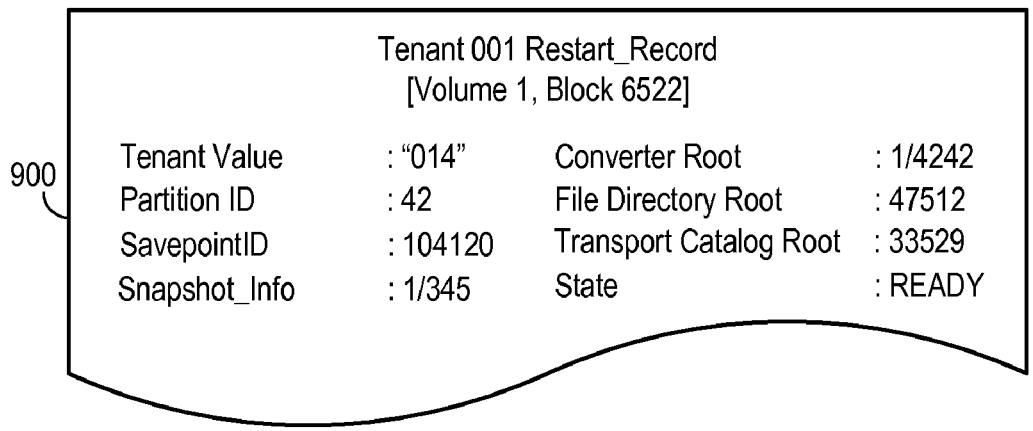
FIG. 9 illustrates a portion of a tenant restart record of a database instance according to some embodiments.
Figure 10:
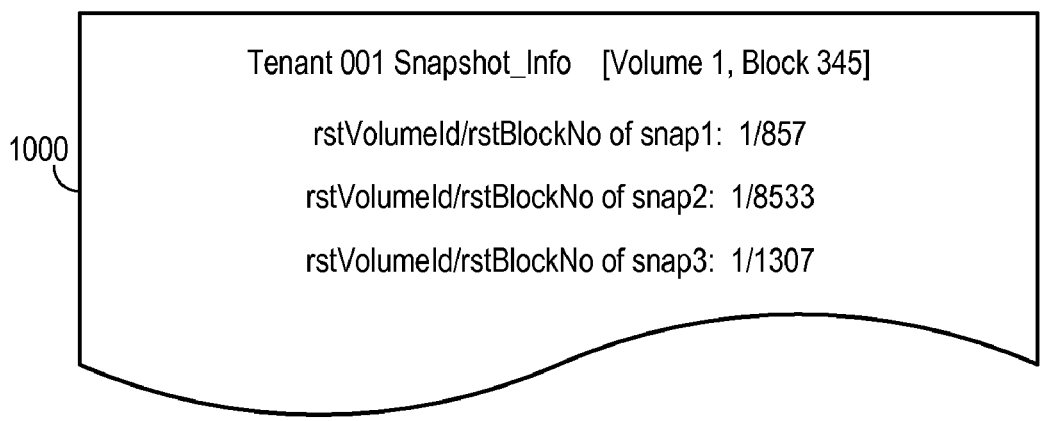
FIG. 10 illustrates a portion of a tenant snapshot information page of a database instance according to some embodiments.

Although the examples of FIGS. 8 through 10 depict a tenant partition including only one volume, embodiments are not limited thereto. In a case that a tenant partition includes multiple volumes, those volumes may be numbered beginning with "1" irrespective of the existence of an identical volume number in one or more other partitions. In this regard, by supporting independent numbering of volumes within each partition of a data area, a partition may be deleted from or added to a data area without concern for the numbering of its volumes.

Database instance 200 also supports an independent shadow copy feature for each partition. The shadow copy feature employs I/O buffer cache 230 as will be described below.

I/O buffer cache 230 is instantiated in cache memory during execution of database instance 200. I/O buffer cache 230 stores various elements of data area 220 during execution of database instance 200. These elements may include recently-accessed pages of application data, converter pages, database catalog objects and/or a log queue. I/O buffer cache 230 is used to increase the responsiveness of instance 200.

I/O buffer cache 230 includes data cache 236, common converter 234, tenant 001 converter 236 and tenant 012 converter 238. Each element of I/O buffer cache 230 is illustrated separately for the sake of clarity. According to some embodiments, the elements might not be stored in separate, contiguous memory addresses of I/O buffer cache 230. For example, the common converter pages may be interspersed among the data pages of data cache 232.

Each of converters 234 through 238 of I/O buffer cache 230 includes a converter map table and converter pages. Upon initial instantiation, the converter map table and converter pages reflect the corresponding converters stored in partitions 222 through 226. More particularly, a root page of a partition's converter is determined from the partition's restart record, and the partition's converter is rebuilt in I/O buffer cache 230.

Figure 11:
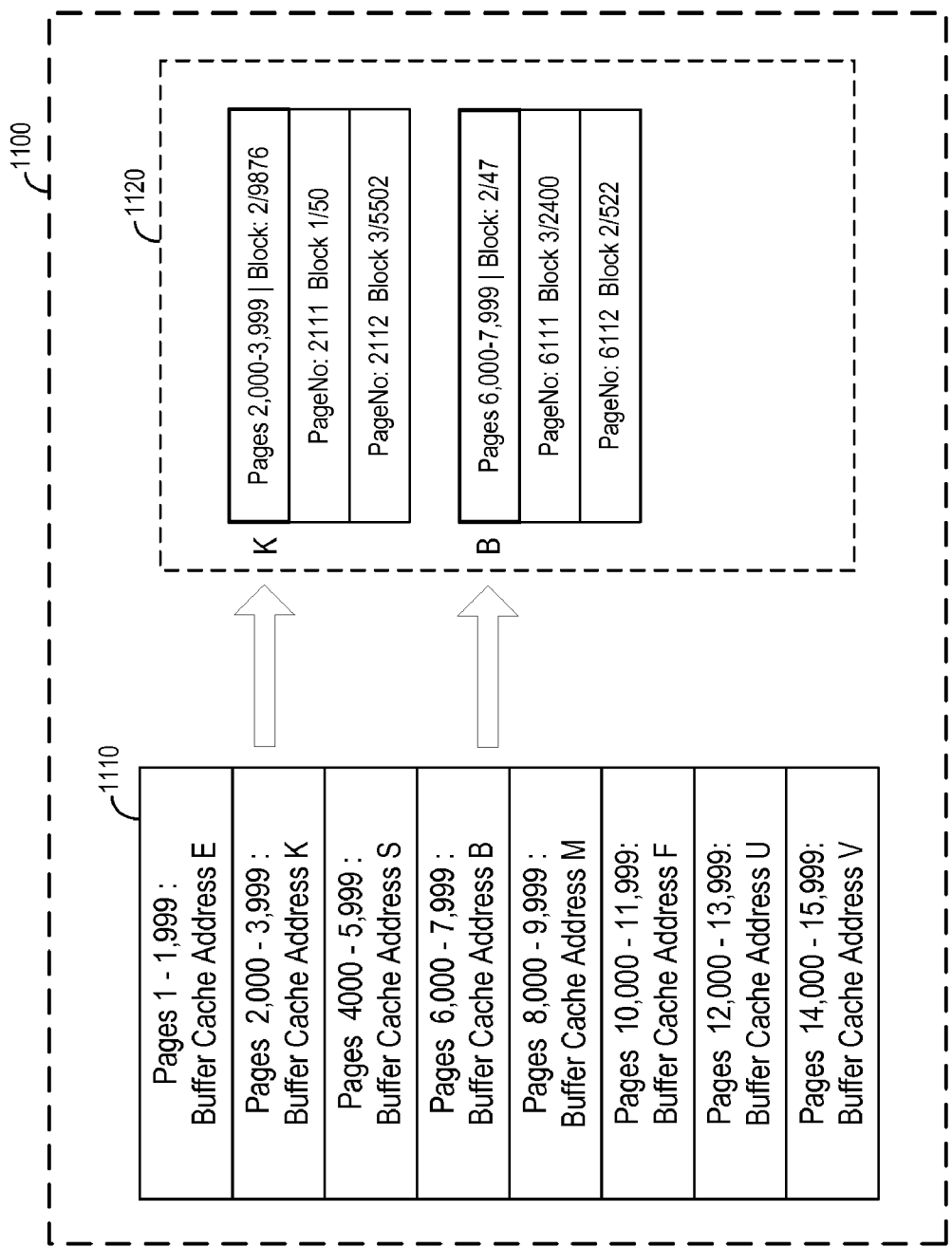
FIG. 11 illustrates elements of a converter in a data cache of an executing database instance according to some embodiments.

FIG. 11 illustrates converter 1100 in a cache memory according to some embodiments. Converter 1100 may comprise any of converters 234 through 238. Converter 1100 provides a runtime association between logical page numbers and physical block addresses of data volumes. For a given page number, converter 1100 indicates a block address (e.g., a data volume number and an offset) at which an associated page is stored. As will be described in detail below, in a case that DBMS 210 cannot find a page in data cache 232, converter 1100 is accessed to determine a location of the page based on the page's logical number.

As shown in FIG. 11, converter map table 1110 specifies several ranges of logical page numbers. Converter map table 1110 associates a memory address of I/O buffer cache 230 with each specified range. As also shown, stored at each memory address is a converter page of converter pages 1120 that lists page numbers in the range associated with each address.

The volume numbers indicated by converter pages 1120 indicate volumes of a partition that is associated with converter 1100. That is, converter pages 1120 specify volumes of tenant 001 partition 224 if converter 1100 corresponds to tenant 001 converter 236 of I/O buffer cache 230.

Generally, data cache 232 stores pages from data area 220 that have been recently read or write-accessed. If a database transaction requires modification of a page, the page is read from a block address of data area 220, the page is modified, and a log entry describing the modification is recorded. The modified page is stored in cache 232, the modified page is designated as modified, and the original "last known good" page remains at the block address of data area from which it was read. Once a number of modified pages in cache 232 reaches a threshold amount, or after passage of a designated time interval, all pages of cache 232 which are designated as modified are written to data area 220.

A modified page is not written to the block address of data area 220 from which it was initially read. Rather, the original unmodified page remains designated as a "last known good" page at its block address and the modified page is written to a new block address of data area 220.

According to some embodiments, DBMS 210 writes the modified to the partition from which the unmodified page was initially read. Therefore, if the original page was located among the common data of common partition 222, the modified page is also written to the common data of common partition 222. Similarly, the modified page is written to the tenant 012 data of tenant 012 partition 226 if the original page was located among the tenant 012 data of tenant 012 partition 226.

A savepoint is periodically initiated to convert the modified pages stored in each of partitions 222 through 226 to "last known good" pages and to free the blocks used by the existing "last known good" pages so that pages may be written thereto. At a savepoint, all pages designated as modified in data cache 232 are written to their corresponding partition as described above. Once all modified pages are written, the "last known good" pages associated with the modified pages are released so that their associated block addresses may be overwritten.

As mentioned above, the converter pages of converters 234 through 238 map logical page numbers to block addresses. Accordingly, these pages are modified once a corresponding data page is saved to a new location of their respective partitions. The modified converter pages are written to their respective partitions at the end of a savepoint, particularly after all modified data pages are written. Then, a restart record of each partition is updated to point to the starting point of the newly-saved converter within the partition.

In case of a system crash, the modified pages stored in a partition are ignored and a partition is reconstructed based on its restart record, its converter pages identified from the restart record, the "last known good" pages (which are identified by the converter pages), and its log entries from a common (i.e., including entries for all partitions) Redo log, which reflect page changes since the last savepoint.

U.S. Pat. No. 7,440,979, entitled Snapshots For Instant Backup In A Database Management System, describes a system in which, at some savepoints, the previous "last known good" pages are not freed for overwriting. Rather, these data pages are marked, tagged, or otherwise identified as being part of a snapshot. Accordingly, the pages will not be overwritten until a command to remove the snapshot is received. The pages of the snapshot may include pages storing application data (e.g., database objects) as well as converter pages pointing thereto. A snapshot restart record pointing to the starting point of this converter is also created and stored in a snapshot_info page as described above.

Accordingly, a tenant partition as described herein may be reconstructed based on its snapshot_info page, the snapshot restart record identified in the snapshot_info page, the converter pages identified from the snapshot restart record, and the "last known good" data pages of the snapshot (which are identified by the converter pages). Notably, this reconstruction is possible even if the partition is moved or copied to another database instance.

Figure 12:
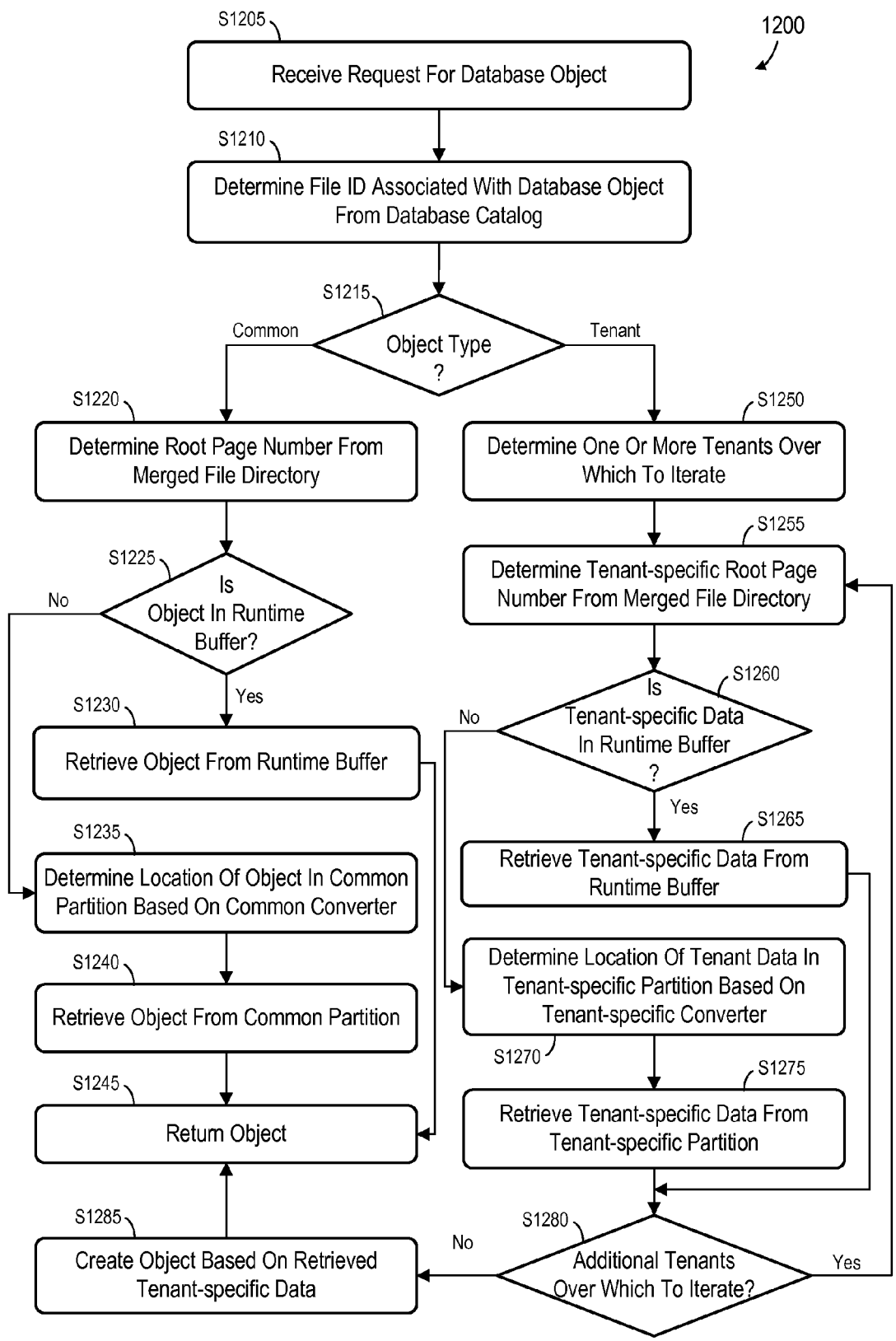
FIG. 12 comprises a flow diagram of a process according to some embodiments.

FIG. 12 is a flow diagram of process 1200 according to some embodiments. Some embodiments of process 1200 may provide access to data stored within a database instance such as database instances 100 and 200. In some embodiments, for example, a hardware environment of database instance 200 executes program code of DBMS 220 using a processor to perform process 1200.

Process 1200 and all other processes mentioned herein may be embodied in processor-executable program code read from one or more of a computer-readable medium, such as a floppy disk, a CD-ROM, a DVD-ROM, a Zip™ disk, and a magnetic tape, and then stored in a compressed, uncompiled and/or encrypted format. In some embodiments, hard-wired circuitry may be used in place of, or in combination with, program code for implementation of processes according to some embodiments. Embodiments are therefore not limited to any specific combination of hardware and software.

A request for a database object is received at S1205. The request may comprise an SQL query received by DBMS 210. The request may be received from any consuming application, including but not limited to a business application. The business application may issue the request based on a request from a client application served by the business application.

According to some embodiments, the requesting application need not be aware of the separation of tenant data within the database instance as described herein. Instead, the requesting application simply requests database objects using SQL SELECT statements. Depending on permissions of the application, the SELECT statements may return data from the common partition, from one tenant partition, or from more than one tenant partition.

At S1210, a file Id associated with the database object is determined. A common partition may include a database catalog as shown in FIG. 2. FIG. 13 illustrates database catalog 1300 according to some embodiments. Database catalog 1300 maps database object names to file identifiers and to other associated metadata. The metadata may specify columns, data types, etc. of the associated database objects.

After determining the file Id from the database catalog, a type of the database object is determined. As shown in FIG. 13, the database catalog includes an extension to specify whether the database object is a "common" object or a "tenant" object. A common object is associated with data stored in a common partition, while a tenant object is associated with data stored in one or more tenant partitions.

It will be initially assumed that the object type is determined to be common at S1215. Flow therefore proceeds to S1220 to determine a root page number from a file directory. FIG. 14 illustrates an in-memory representation of merged file directory 1400 to explain S1215 according to some embodiments.

File directory 1400 is created in memory prior to process 1200 based on the file directories of the common partition and all tenant partitions. For each object indicated as "common" in catalog 1300, file directory 1400 includes a file Id and a logical page number for locating the database object.

For an object indicated as "tenant" in catalog 1300, file directory 1400 includes a placeholder entry specifying the file Id of the object but including null entries for the master partition file Id and the root. For this object, file directory 1400 also includes entries for each tenant partition, in which the file Id is composed of the file Id indicated by the database catalog, a file system index, and a partition Id. In the present example, bit 1 of byte 1 indicates a persistency type (e.g., 0 (permanent) or 1 (temporary)), bit 2 to bit 6 of byte 1 indicate a file system index (i.e., 0, 1, . . . , 31), bit 7 and bit 8 of byte 1 and all of byte 2 together indicate the partition Id of the associated tenant partition (i.e., 0, . . . , 1023), and the remaining six bytes indicate the file Id specified by the database catalog.

Returning to process 1200, the page number is used at S1225 to determine if the object is located in the runtime buffer (e.g., I/O buffer cache 230). If so, flow proceeds to s1230 to retrieve the object therefrom and on to S1245 to return the object to the requestor. If the determination at S1225 is negative, a location of the object is determined from the common converter of the runtime buffer (e.g., common converter 234). As described above, the block addresses specified by common converter 234 are located within common partition 222.

The object is then retrieved from the common partition at S1240 based on the determined location, and returned to the requestor at S1245.

Flow proceeds from S1215 to S1250 if the requested object is determined to be of "tenant" type. At S1250, the request is analyzed to determine one or more tenants over which to iterate the request. For example, if the request specifies data of two tenants, it is determined at S1250 to iterate over the two tenants.

Therefore, for a first tenant of the one or more determined tenants, a tenant-specific root page number is determined at S1255. The root page may be determined from file directory 1400 based on the file Id determined at S1210 and the partition Id associated with the tenant.

The page number is used at S1260 to determine if the associated tenant-specific data is located in the runtime buffer (e.g., I/O buffer cache 230). If so, flow proceeds to S1265 to retrieve the data therefrom and continues to S1280.

If the associated tenant-specific data is not located in the runtime buffer, a location of the data is determined from the associated tenant-specific converter of the runtime buffer (e.g., tenant 001 converter 236) at S1270. Again, the block addresses specified by tenant 001 converter 236 are located within tenant 001 partition 224. The data is then retrieved from the tenant-specific partition at S1275.

Next, at S1280, it is determined whether additional tenants were determined at S1250. If so, flow returns to S1255 and continues as described above to retrieve data associated with the object and with a different tenant from the runtime buffer (i.e., at S1265) or from a tenant-specific partition associated with the different tenant (i.e., at S1275).

After iterating over all determined tenants, flow continues from S1280 to S1285 to create an object based on the retrieved tenant-specific data. The object is then returned to the requestor at S1245.

As will be described below, each partition of database instance 200 may also store log volumes in a log area (not shown). Such log volumes store information indicating changes made to stored data.

Figure 15:
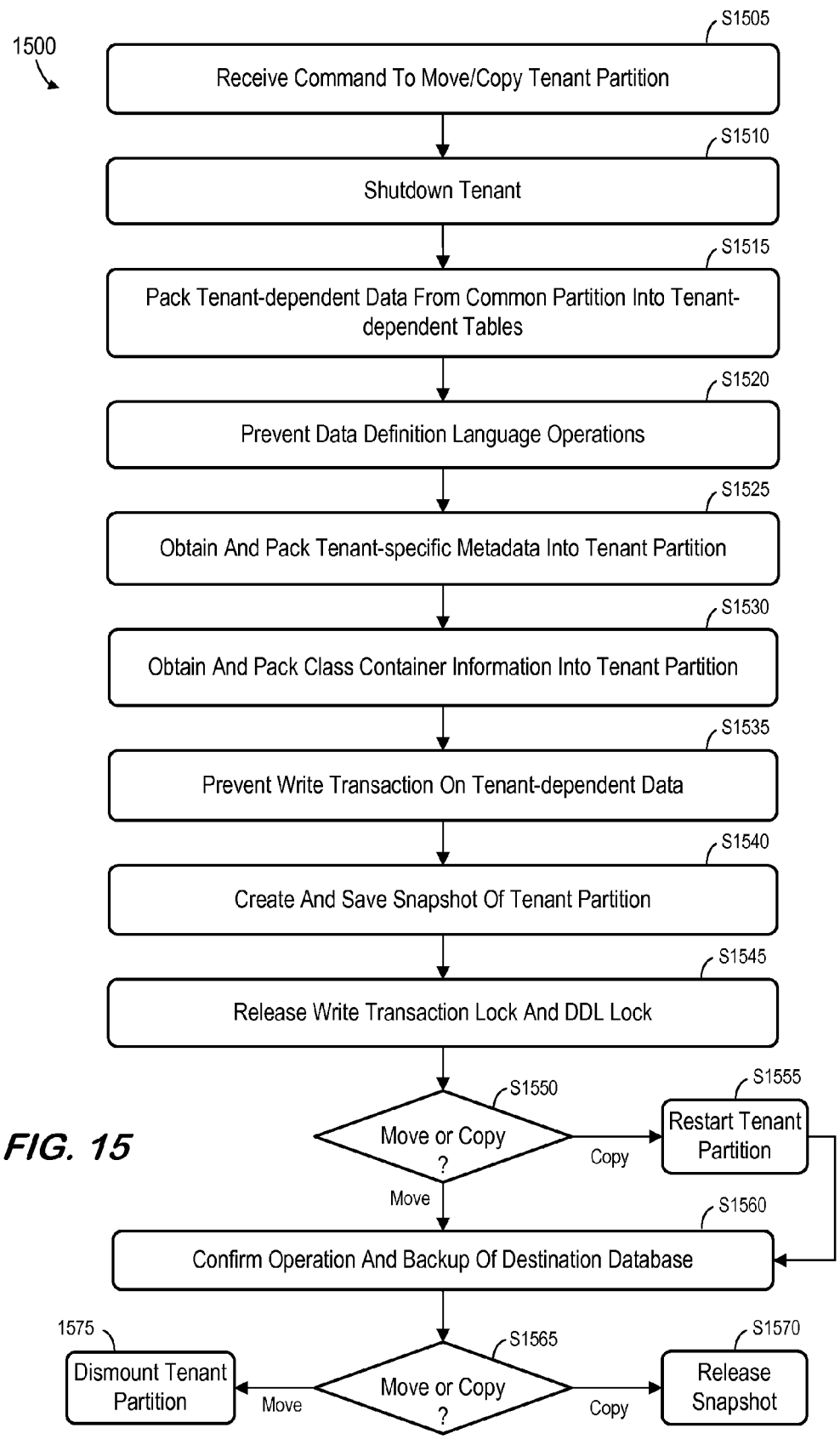
FIG. 15 comprises a flow diagram of a process according to some embodiments.

FIG. 15 is a flow diagram of process 1500 according to some embodiments. Some embodiments of process 1500 may prepare a tenant partition of a first database instance for copying to another database instance.

A command to copy a tenant partition is received at S1505. The command may be input by an administrator and received by DBMS 210 of instance 230. For example, the administrator may input a command to instruct DBMS 210 to copy tenant 001 partition 224 to another specified database instance.

A tenant shutdown is performed at S1510. The tenant shutdown prevents access to the tenant-specific data of the tenant partition to be moved/copied. In some embodiments, Undo files of committed transactions may exist after shutdown of the tenant partition due to outstanding garbage collection processing. An example for addressing these Undo files will be described below.

Next, at S1515, any tenant-dependent data stored in the common partition is packed into tenant-dependent tables. This data may include client-specific table data and index data. Next, a Data Definition Language (DDL) lock is acquired at S1520 to prevent data definition language operations. This lock prevents changes to the metadata describing the data of the tenant partition.

In this regard, at S1525, tenant-specific metadata of the database catalog is obtained and packed into the tenant partition. This metadata may include the metadata of tenant-type database objects as described with respect to database catalog 1300. Additionally, at S1530, class container information (e.g., LiveCache object data) may be obtained and packed into the tenant partition.

Write transactions on tenant-specific data are prevented (i.e., locked) at S1535. A tenant-specific snapshot is then created and saved to a storage device external to the database instance of the tenant partition at S1540. As described above, the tenant-specific snapshot is completely reflected in the data of the tenant partition to be moved. That is, the data of the tenant partition may be fully reconstructed based on the data (i.e., tenant restart record, tenant snapshot_info page, tenant converter, tenant data) of the snapshot. It is noted that the saved snapshot also includes the packed data described with respect to S1515, S1525 and S1530.

The write transaction lock and DDL lock are released at S1545. If the tenant partition is being copied, then flow proceeds from S1550 to S1555 to restart the tenant partition in the source database instance. If the tenant partition is being moved (or after performance of S1555), it is confirmed at S1560 that the destination database instance is operating successfully with its new partition and that the destination database instance has been successfully backed up.

Flow continues from S1565 to S1570 if the tenant partition is being copied. At S1570, the snapshot created at S1540 is released. If the tenant partition is being moved, flow proceeds from S1565 to S1575, where the data volume(s) of the tenant partition are dismounted from the source database instance.

The confirmation at S1560 is required before releasing the snapshot because, if a move/copy is not successful, the destination database instance must be recovered to a point in time before the move/copy and its the Redo Log must be re-run. This re-run includes the entire move/copy process and requires re-copying the tenant partition to the destination database instance.

Also, the snapshot created in the source database instance is not required once the destination database instance is backed up, because disaster recovery of the destination instance will use with the last/youngest database backup.

Figure 16:
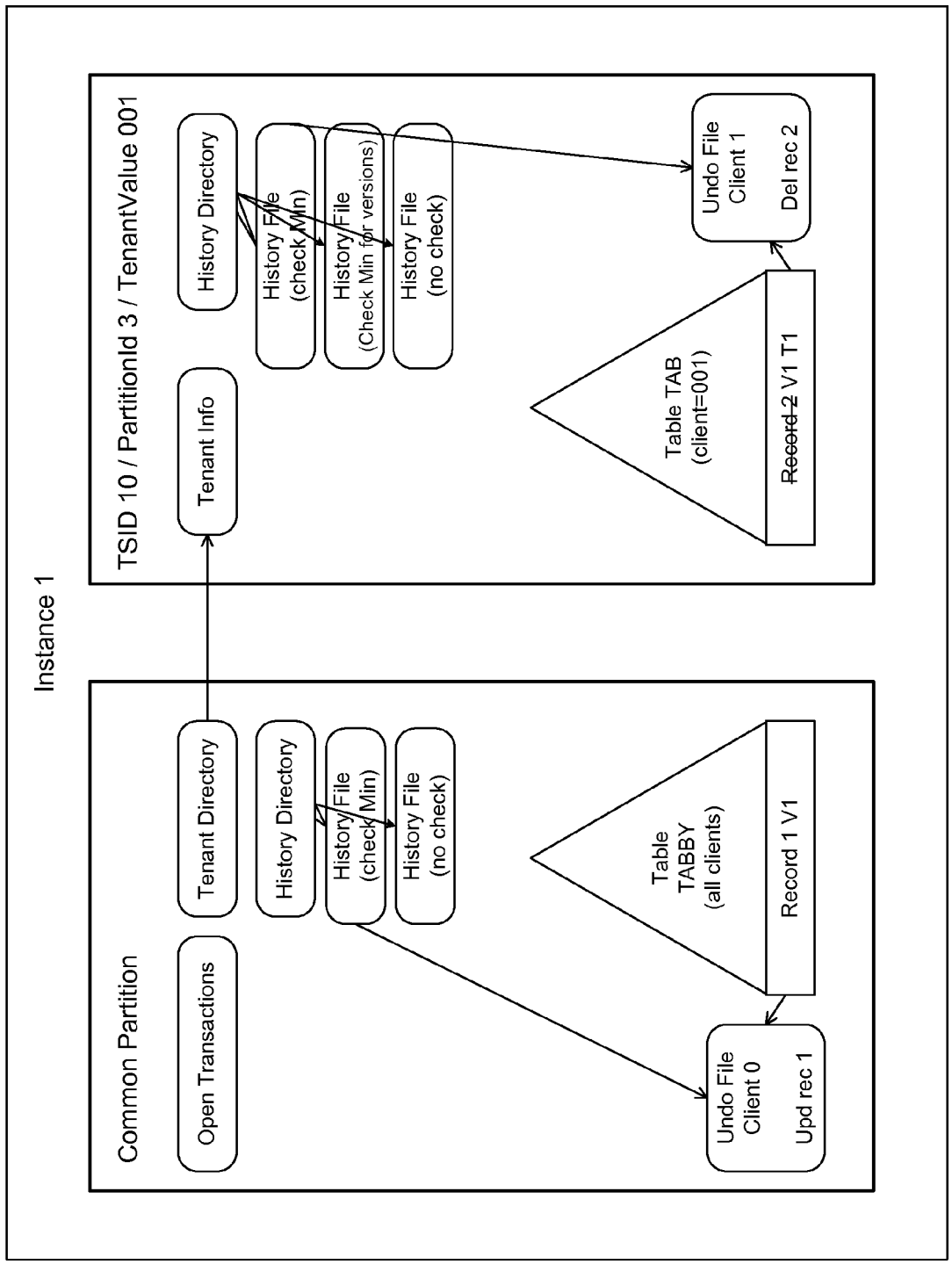
FIGS. 16 and 17 illustrate Undo file processing within a source database instance according to some embodiments.
Figure 17:
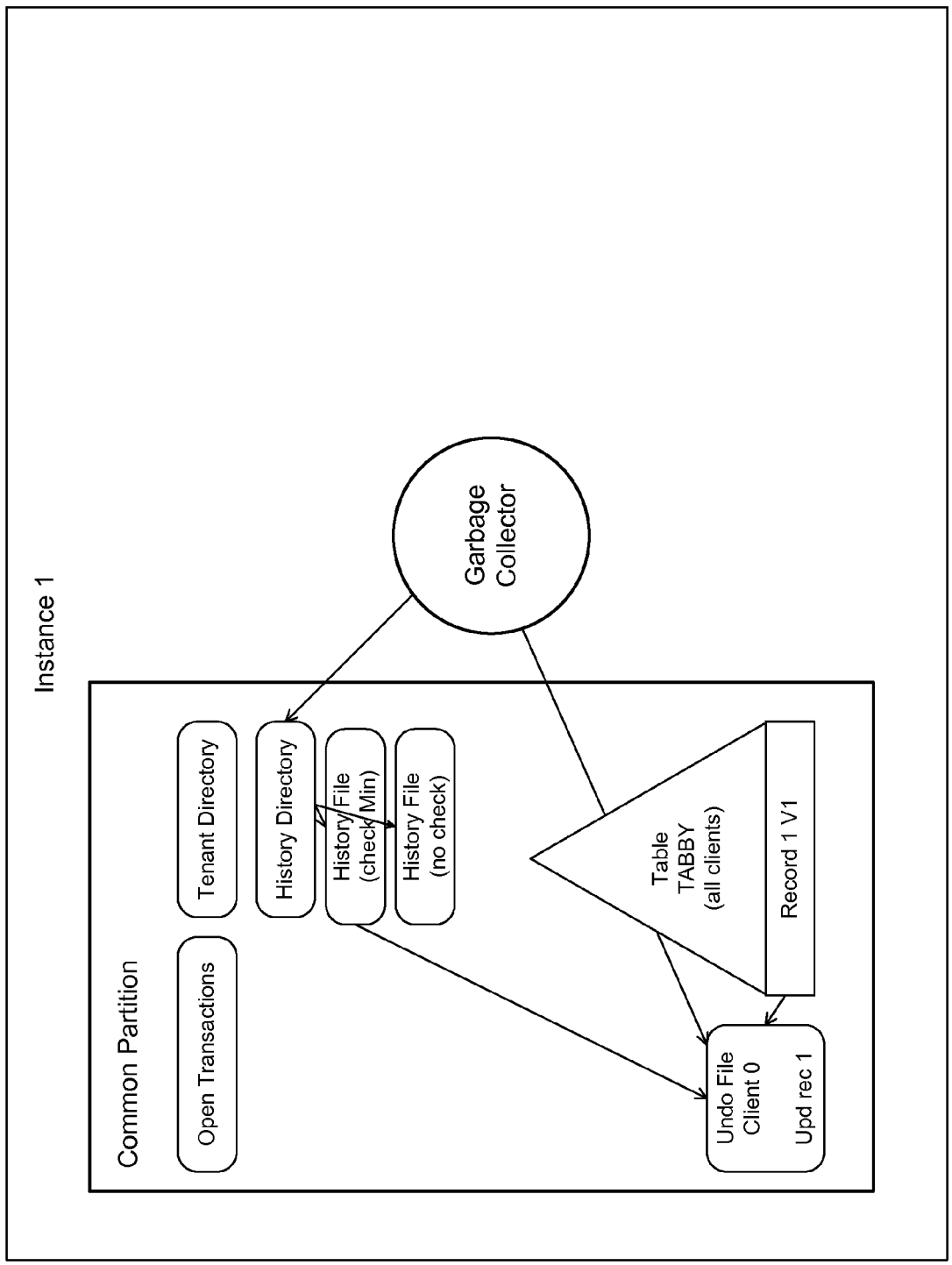

To minimize downtime of the source database instance, some embodiments employ mechanisms for interrupting maintenance/administrative processes prior to moving/copying the tenant partition to the target database instance, and for completing such processes thereafter. FIGS. 16 and 17 illustrate operation of such a mechanism in a source database instance according to some embodiments.

FIG. 16 shows a source database instance (i.e., Instance 1) including a common partition and one tenant partition. Instance 1 includes two Undo files corresponding to recent transactions. A first Undo file corresponds to deletion of a record in the tenant partition and is stored in a history file of the tenant partition. A second Undo file corresponds to an update of a record in the common partition and is stored in a history file of the common partition.

FIG. 17 shows Instance 1 after the tenant partition has been moved to a target database instance per process 1500. As shown, a garbage collector processes (i.e., deletes) the Undo information from the source database instance after the tenant partition has been moved.

Figure 18:
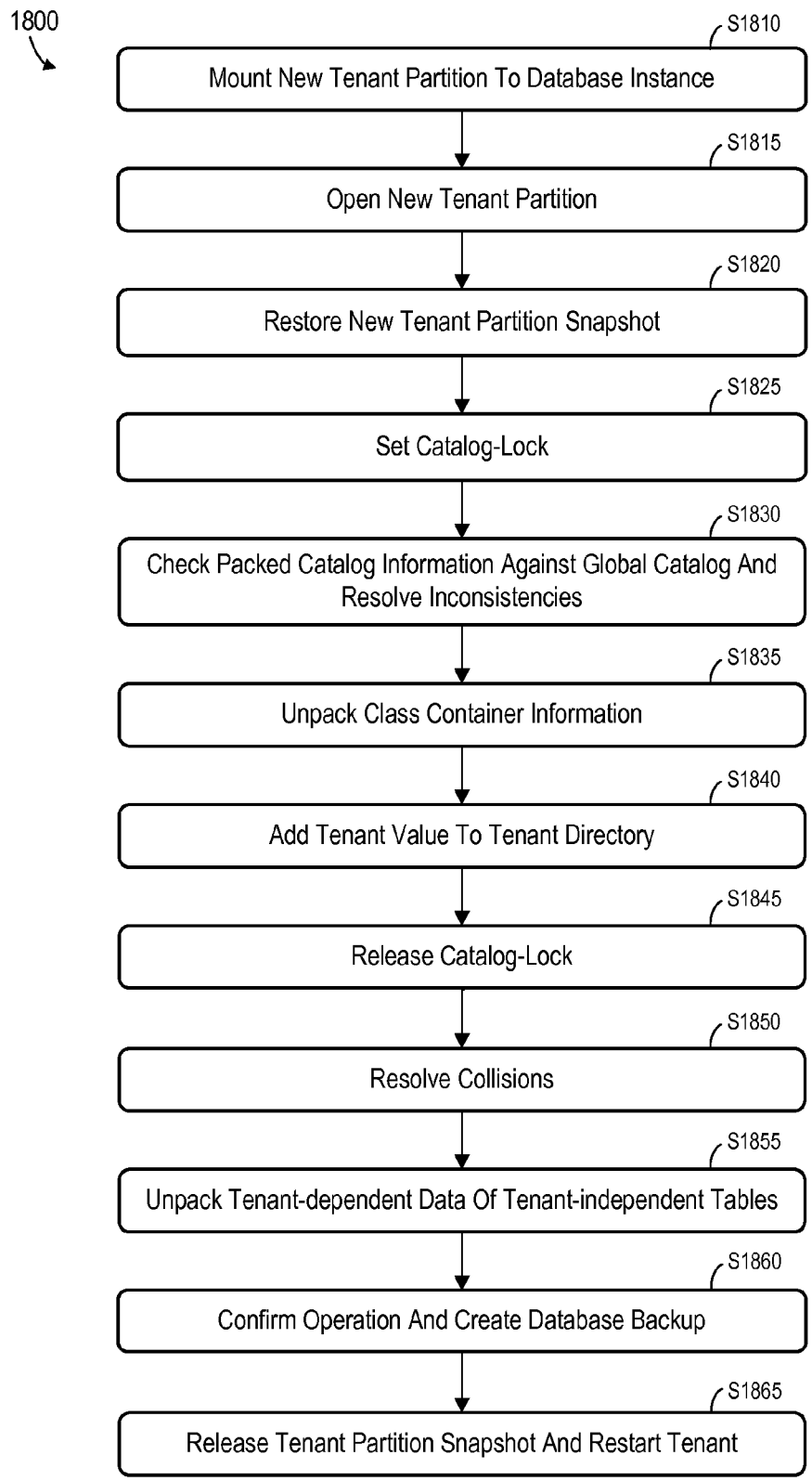
FIG. 18 comprises a flow diagram of a process according to some embodiments.

FIG. 18 is a flow diagram of process 1800 to attach a tenant partition to an existing database instance. The new tenant partition is attached to the target database instance at S1810. Attachment may consist of mounting the volumes of the tenant partition to the database instance via configuration files and a tenant directory of the common partition of the database instance.

The tenant partition is opened at S1815 and the previously-created snapshot is restored at S1820. At S1825, tenant-specific locks are set to prevent changes to the database catalog of the target database instance.

Next, at S1830, the packed metadata of the new partition is checked against the global catalog of the target database instance to identify and resolve any inconsistencies therebetween. For example, a DBMS may be notified of any collisions and/or inconsistencies, and the effected tables may be imported as a single table using an auxiliary schema.

Any class container information is unpacked from the tenant partition at S1835. A tenant value is also assigned to the new tenant partition by a tenant life cycle management application (TLM) at S1840. This new tenant value comes from an SQL select statement based on the tenant directory of the destination instance. During the import, the new tenant value is added to the tenant directory to avoid multiple usage of a same tenant value. The catalog lock is then released at S1845.

Any metadata collisions are resolved at S1850. Resolution may consist of manually and/or automatically mapping, the imported metadata of the auxiliary schema to the physical layout of the target database instance. Such mapping may include swapping, deleting, and/or adding database columns.

Any packed tenant-dependent data of tenant-independent tables (e.g., stored in the "transport" table) is unpacked at S1855. Next, at S1860, successful operation of the new tenant partition is confirmed and a backup of the database is created. The tenant partition snapshot within the new tenant partition volume is released and the tenant is restarted at S1860.

Figure 19:
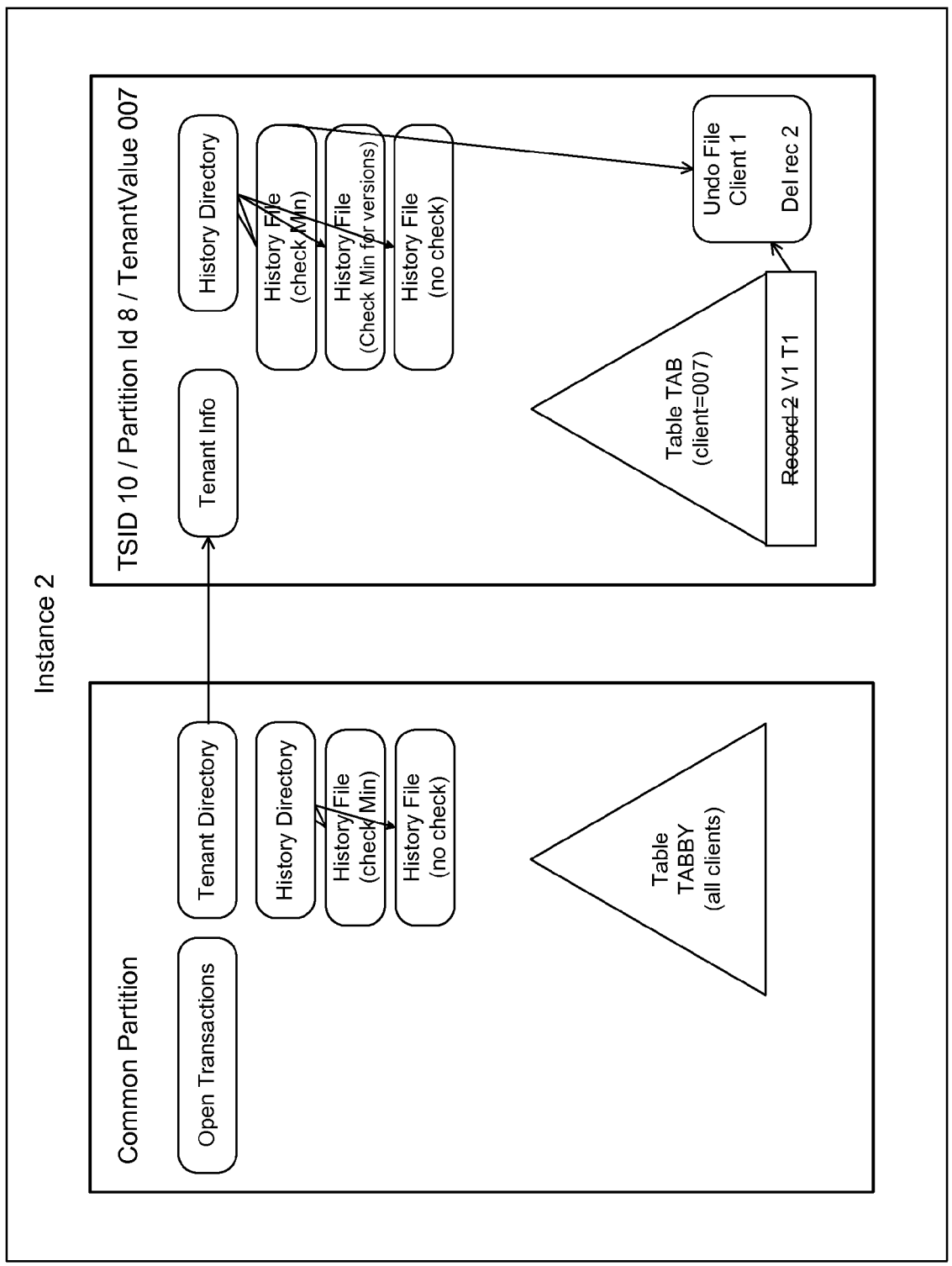
FIGS. 19 and 20 illustrate Undo file processing within a target database instance according to some embodiments.
Figure 20:
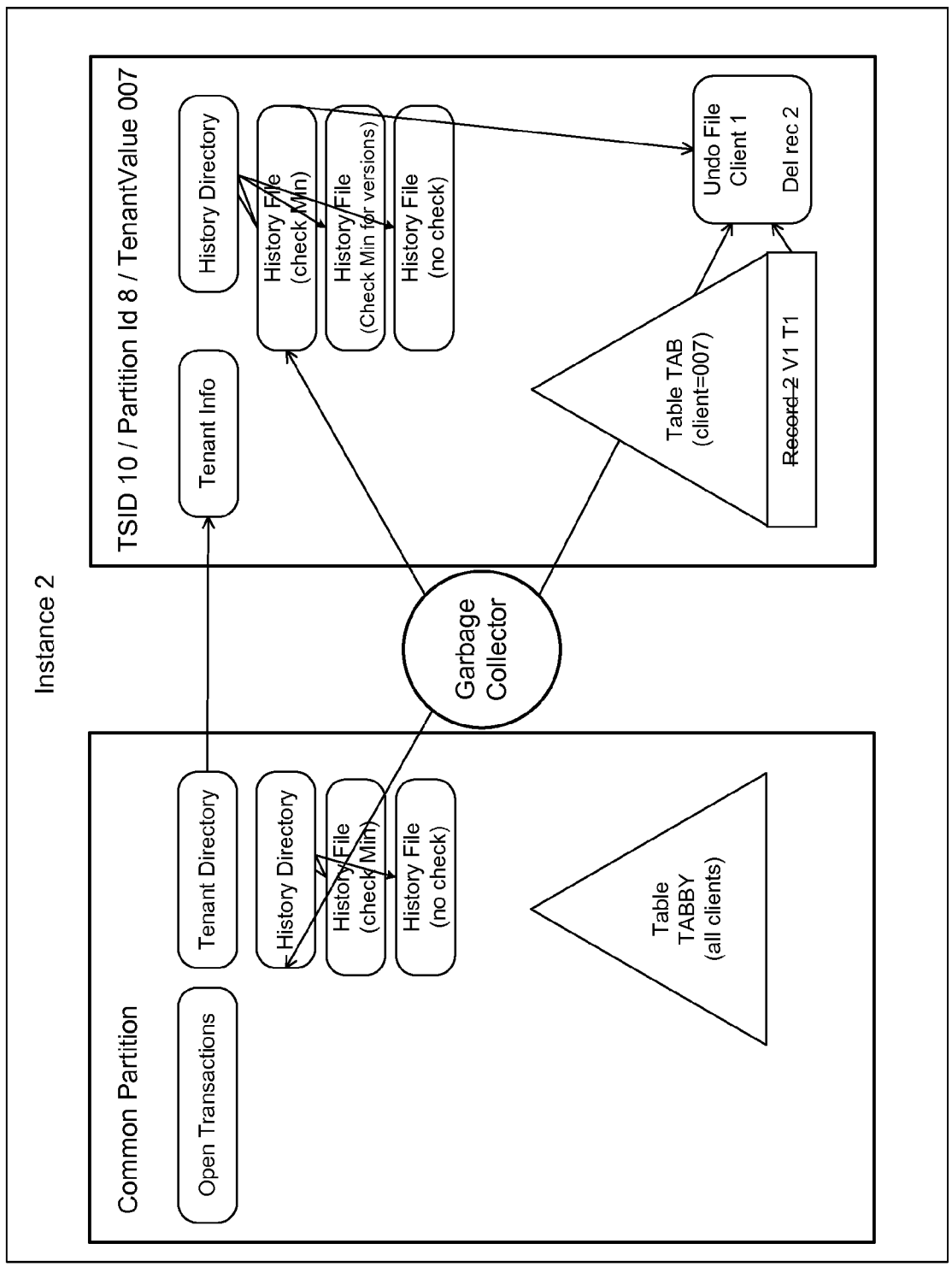

FIG. 19 illustrates the tenant partition of the FIG. 16 example after S1860. It is noted that the tenant value has changed from the value which was associated with the tenant partition in database instance 1. The new tenant partition includes an unprocessed Undo file. Therefore, at restart, a garbage collector may process this Undo file as well as any Undo files of the common partition of Instance 2 as shown in FIG. 20.

Elements described herein as communicating with one another are directly or indirectly capable of communicating over any number of different systems for transferring data, including but not limited to shared memory communication, a local area network, a wide area network, a telephone network, a cellular network, a fiber-optic network, a satellite network, an infrared network, a radio frequency network, and any other type of network that may be used to transmit information between devices. Moreover, communication between systems may proceed over any one or more transmission protocols that are or become known, such as Asynchronous Transfer Mode (ATM), Internet Protocol (IP), Hypertext Transfer Protocol (HTTP) and Wireless Application Protocol (WAP).

The embodiments described herein are solely for the purpose of illustration. Those in the art will recognize other embodiments which may be practiced with modifications and alterations.

What is claimed is:

1. A system comprising:
    a database instance comprising:
    a physical data storage system having a data store area configured to store a first data partition, a second data partition, and a third data partition;
    the first data partition including a first plurality of database pages storing tenant-independent data, and a first converter associated with the first partition;
    the second data partition including a second plurality of database pages storing data associated with a tenant, and a second converter associated with the second partition;
    the third data partition including a third plurality of database pages storing data associated with a second tenant, and a third converter associated with the third data partition;
    a database management system having a processor configured to execute at least one operating system process, the database management system configured to receive a request for a database object and determine whether the database object is associated with tenant-independent data or with tenant-specific data;
    the database management system further configured to retrieve data of the second database pages, to determine a location of third database pages associated with the database object within the third plurality of database pages based on the third converter, if the database object is associated with tenant-specific data, to retrieve data of the third database pages, and to return an object based on the data of the second database pages and the data of the third database pages;
    if the database object is associated with tenant-independent data, the database management system is configured to determine a location of first database pages associated with the database object within the first plurality of database pages based on the first converter; and
    if the database object is associated with tenant-specific data, the database management system is configured to determine a location of second database pages associated with the database object within the second plurality of database pages based on the second converter.

2. The system according to claim 1, further comprising:
    a data cache comprising at least one physical system configured to store a current version of the first converter and a current version of the second converter.

3. The system according to claim 1, further comprising:
    a data cache comprising at least one physical system configured to store a current version of the first converter and a current version of the second converter,
    wherein the database management system is further configured to:
    determine to create a savepoint; and
    in response to the determination to create a savepoint, save the current version of the first converter to the first data partition and save the current version of the second converter to the second data partition.

4. The system according to claim 3, the data cache further configured to store current versions of one or more of the first plurality of database pages and current versions of one or more of the second plurality of database pages, and
    in response to the determination to create the savepoint, the database management system is further configured to save the current versions of the one or more of the first plurality of database pages to the first data partition and the current versions of the one or more of the second plurality of database pages to the second data partition.

5. The system according to claim 1, further comprising:
    the physical data storage system including a database catalog configured to store metadata indicating whether the database object is associated with tenant-independent data or with tenant-specific data,
    wherein the determination of whether the database object is associated with tenant-independent data or with tenant-specific data is based on the metadata.

6. The system according to claim 1, further comprising:
    the physical data storage system including a database catalog configured to store metadata associated with the tenant-independent data and with the tenant-specific data,
    the database management system further configured to:
    pack tenant-specific metadata of the database catalog into the second partition; and
    create a snapshot of the second partition including the tenant-specific metadata.

7. The system according to claim 6, further comprising:
    a data cache comprising at least one physical system configured to store a current version of the first converter and a current version of the second converter,
    a second database instance comprising:
    a second data cache storing a current version of the third converter;
    a second database management system configured to:
    create a fourth data partition of the second data storage system based on the snapshot of the second partition;
    create a fourth converter associated with the fourth data partition in the fourth data partition; and
    create a current version of the fourth converter in the second data cache.

8. The system according to claim 7, the second database management system further to:
    receive a request for a second database object;

determine whether the second database object is associated with tenant-independent data or with tenant-specific data;

if the second database object is associated with tenant-independent data, determine a location of third database pages associated with the second database object within the third plurality of database pages based on the third converter; and if the database object is associated with tenant-specific data, determine a location of fourth database pages associated with the second database object within the fourth plurality of database pages based on the fourth converter.

9. The system according to claim 7, wherein the second data storage system further stores:

a fifth data partition, the fifth data partition comprising a fifth plurality of database pages storing data associated with a second tenant; and a fifth converter associated with the fifth data partition, and wherein the second database management system is further to:

receive a request for a second database object;

determine that the second database object is associated with tenant-specific data;

determine a location of fourth database pages associated with the second database object within the fourth plurality of database pages based on the fourth converter;

retrieve data of the fourth database pages;

determine, if the second database object is associated with tenant-specific data, a location of fifth database pages associated with the second database object within the fifth plurality of database pages based on the fifth converter;

retrieve data of the fifth database pages; and return an object based on the data of the fourth database pages and the data of the fifth database pages.

10. A computer-implemented method for a database instance, the database instance comprising a first data partition including a plurality of database pages storing tenant-independent data and a first converter associated with the first partition, a second data partition, the second data partition including a plurality of database pages storing data associated with a tenant and a second converter associated with the second partition, and a third data partition including plurality of database pages storing data associated with a second tenant, and a third converter associated with the third data partition, the method comprising:

a databases management system receiving a request for a database object, the database management system having a processor configured to execute at least one operating system process;

the at least one operating system process determining whether the database object is associated with tenant-independent data or with tenant-specific data, the at least one operating system process further retrieving data of the second database pages, determining a location of third database pages associated with the database object within the third plurality of database pages based on the third converter, if the database object is associated with tenant-specific data, retrieving data of the third database pages, and returning an object based on the data of the second database pages and the data of the third database pages;

if the database object is associated with tenant-independent data, determining a location of first database pages associated with the database object within the first plurality of database pages based on the first converter; and if the database object is associated with tenant-specific data, determining a location of second database pages associated with the database object within the second plurality of database pages based on the second converter.

11. The method according to claim 10, wherein the third data partition plurality of database pages storing tenant-specific data, the method further comprising:

retrieving data of the second database pages;

determining, if the database object is associated with tenant-specific data, a location of third database pages associated with the database object within the third plurality of database pages based on the third converter;

retrieving data of the third database pages; and returning an object based on the data of the second database pages and the data of the third database pages.

12. The method according to claim 10, wherein the database instance includes a data cache comprising at least one physical system configured to store a current version of the first converter and a current version of the second converter, the method further comprising:

determining to create a savepoint; and in response to the determination to create a savepoint, saving a current version of the first converter from the data cache to the first data partition and saving the current version of the second converter from the data cache to the second data partition.

13. The method according to claim 12, further comprising:

saving, in response to the determination to create the savepoint, current versions of the one or more of the first plurality of database pages from the data cache to the first data partition and current versions of the one or more of the second plurality of database pages from the data cache to the second data partition.

14. The method according to claim 10, further comprising:

determining whether the database object is associated with tenant-independent data or with tenant-specific data based on metadata of a database catalog.

15. The method according to claim 10, further comprising:

packing tenant-specific metadata of a database catalog into the second partition; and creating a snapshot of the second partition including the tenant-specific metadata.

16. The method according to claim 15, further comprising:

creating a fourth data partition of a second database instance based on the snapshot of the second partition, the third plurality of database pages storing tenant-independent data; and creating a fourth converter associated with the fourth data partition in the fourth data partition.

17. The method according to claim 16, further comprising:

receiving a request for a second database object at the second database instance;

determining whether the second database object is associated with tenant-independent data or with tenant-specific data;

if the second database object is associated with tenant-independent data, determining a location of third database pages associated with the second database object within the third plurality of database pages based on the third converter; and if the database object is associated with tenant-specific data, determining a location of fourth database pages associated with the second database object within the fourth plurality of database pages based on the fourth converter.

18. The method according to claim 16, wherein the second database instance comprises a fifth partition comprising a fifth plurality of database pages storing data associated with a second tenant, and a fifth converter associated with the fifth partition, the method further comprising:
    receiving a request for a second database object;
    determining that the second database object is associated with tenant-specific data;
    determining a location of fourth database pages associated with the second database object within the fourth plurality of database pages based on the fourth converter;
    retrieving data of the fourth database pages;
    determining, if the second database object is associated with tenant-specific data, a location of fifth database pages associated with the second database object within the fifth plurality of database pages based on the fifth converter;
    retrieving data of the fifth database pages; and
    returning an object based on the data of the fourth database pages and the data of the fifth database pages.

* * * * *